United States Patent
Fukae et al.

(10) Patent No.: US 11,401,587 B2
(45) Date of Patent: Aug. 2, 2022

(54) CEMENTED CARBIDE, CUTTING TOOL CONTAINING THE SAME, AND METHOD OF MANUFACTURING CEMENTED CARBIDE

(71) Applicant: Sumitomo Electric Industries, Ltd., Osaka (JP)

(72) Inventors: Kosuke Fukae, Osaka (JP); Hiroaki Gotou, Osaka (JP); Masato Michiuchi, Osaka (JP); Keiichi Tsuda, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 69 days.

(21) Appl. No.: 16/606,940

(22) PCT Filed: Jan. 29, 2019

(86) PCT No.: PCT/JP2019/002981
§ 371 (c)(1),
(2) Date: Oct. 21, 2019

(87) PCT Pub. No.: WO2019/207876
PCT Pub. Date: Oct. 31, 2019

(65) Prior Publication Data
US 2021/0025038 A1   Jan. 28, 2021

(30) Foreign Application Priority Data
Apr. 26, 2018 (JP) .............................. JP2018-085641

(51) Int. Cl.
*C22C 29/08* (2006.01)
*B23B 27/14* (2006.01)
(Continued)

(52) U.S. Cl.
CPC .............. *C22C 29/08* (2013.01); *B23B 27/14* (2013.01); *B23C 5/16* (2013.01); *C22C 1/051* (2013.01)

(58) Field of Classification Search
CPC ............ C22C 29/08; B23B 27/14; B23C 5/16
(Continued)

(56) References Cited

U.S. PATENT DOCUMENTS

| 4,812,370 | A |   | 3/1989 | Okada et al. |
| 5,181,953 | A | * | 1/1993 | Nakano ................... C22C 29/08 |
|           |   |   |        | 75/243 |

(Continued)

FOREIGN PATENT DOCUMENTS

| WO | 2011/136197 A1 | 11/2011 |
| WO | 2018/193659 A1 | 10/2018 |

OTHER PUBLICATIONS

Office Action issued in U.S. Appl. No. 16/768,214 dated Dec. 1, 2020.
(Continued)

*Primary Examiner* — Archene A Turner
(74) *Attorney, Agent, or Firm* — Baker Botts L.L.P.; Michael A. Sartori

(57) ABSTRACT

Cemented carbide contains first hard-phase particles containing WC, second hard-phase particles which contain carbonitride containing at least Ti and Nb, and a metallic binder phase containing an iron-group element. The second hard-phase particle includes a granular core portion. The core portion contains composite carbonitride expressed as $Ti_{1-X-Y}Nb_XW_YC_{1-Z}N_Z$, where X is not smaller than 0.1 and not greater than 0.2, Y is not smaller than 0 and not greater than 0.05, and Z is not smaller than 0.3 and not greater than 0.6. The cemented carbide has an absolute value of a difference not greater than 10, between a ratio (%) of an area
(Continued)

occupied by the second hard-phase particles at a surface thereof and a ratio (%) of an area occupied by the second hard-phase particles in a region extending from the surface by 0.5 mm in a direction of depth.

7 Claims, 1 Drawing Sheet

(51) Int. Cl.
*B23C 5/16* (2006.01)
*C22C 1/05* (2006.01)

(58) Field of Classification Search
USPC .......................................................... 418/698
See application file for complete search history.

(56) References Cited

U.S. PATENT DOCUMENTS

| | | | |
|---|---|---|---|
| 2002/0051871 A1* | 5/2002 | Palmqvist | C23C 30/005 428/209 |
| 2006/0093508 A1 | 5/2006 | Ahlen et al. | |
| 2013/0036866 A1 | 2/2013 | Tamura et al. | |
| 2020/0048747 A1 | 2/2020 | Michiuchi et al. | |

OTHER PUBLICATIONS

Office Action issued in U.S. Appl. No. 16/768,214 dated Mar. 8, 2021.

Office Action issued in U.S. Appl. No. 16/337,644 dated Dec. 13, 2021.

Office Action issued in U.S. Appl. No. 16/337,644 dated Jul. 15, 2021.

* cited by examiner

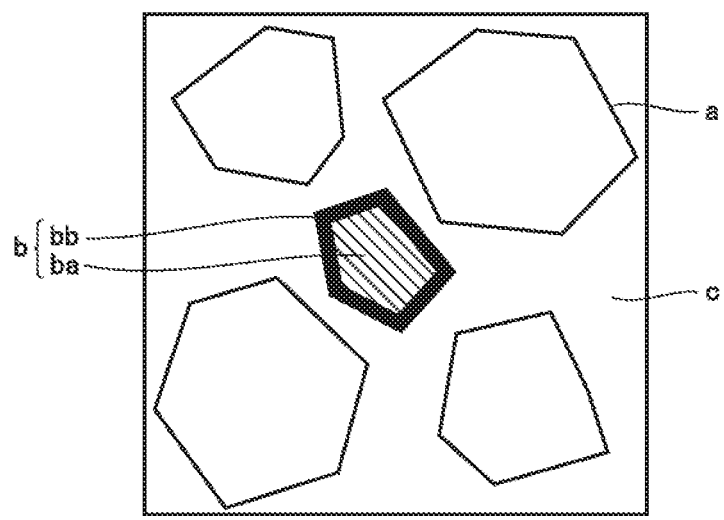

CEMENTED CARBIDE, CUTTING TOOL CONTAINING THE SAME, AND METHOD OF MANUFACTURING CEMENTED CARBIDE

TECHNICAL FIELD

The present disclosure relates to cemented carbide, a cutting tool containing the same, and a method of manufacturing cemented carbide. The present application claims priority to Japanese Patent Application No. 2018-085641 filed on Apr. 26, 2018, the entire contents of the Japanese Patent Application being incorporated herein by reference.

BACKGROUND ART

Cemented carbide and cermet have been known as a hard material containing Ti. Since such a hard material is excellent in wear resistance, it is suitably used for a cutting tool and a wear-resistant tool. For example, WO2011/136197 (PTL 1) discloses cermet composed of a first hard phase composed of a composite carbonitride solid solution, a second hard phase composed of WC, and a binder phase mainly composed of both or one of Co and Ni.

CITATION LIST

Patent Literature

PTL 1: WO2011/136197

SUMMARY OF INVENTION

Cemented carbide according to one manner of the present disclosure contains first hard-phase particles containing WC, second hard-phase particles which contain carbonitride containing at least Ti and Nb, and a metallic binder phase containing an iron-group element. The second hard-phase particle includes a granular core portion and a peripheral portion which covers at least a part of the core portion. The core portion contains composite carbonitride expressed as $Ti_{1-X-Y}Nb_XW_YC_{1-Z}N_Z$, where X is not smaller than 0.1 and not greater than 0.2, Y is not smaller than 0 and not greater than 0.05, and Z is not smaller than 0.3 and not greater than 0.6. The peripheral portion is different in composition from the core portion. The cemented carbide has an absolute value of a difference not greater than 10, between a ratio (%) of an area occupied by the second hard-phase particles at a surface of the cemented carbide and a ratio (%) of an area occupied by the second hard-phase particles in a region extending from the surface by 0.5 mm in a direction of depth.

A cutting tool according to one manner of the present disclosure contains the cemented carbide.

A method of manufacturing cemented carbide according to one manner of the present disclosure is a method of manufacturing cemented carbide including preparing powders of composite carbonitride expressed as $Ti_{1-X-Y}Nb_XW_YC_{1-Z}N_Z$, WC powders, and powders of an iron-group element, obtaining mixed powders by mixing the powders of the composite carbonitride, the WC powders, and the powders of the iron-group element, obtaining a formed material by pressing the mixed powders, and obtaining a sintered material by sintering the formed material. X is not smaller than 0.1 and not greater than 0.2, Y is not smaller than 0 and not greater than 0.05, and Z is not smaller than 0.3 and not greater than 0.6. The cemented carbide obtained by the method of manufacturing cemented carbide has an absolute value of a difference not greater than 10, between a ratio (%) of an area occupied by second hard-phase particles containing the composite carbonitride at a surface of the cemented carbide and a ratio (%) of an area occupied by the second hard-phase particles in a region extending from the surface by 0.5 mm in a direction of depth.

BRIEF DESCRIPTION OF DRAWINGS

FIG. 1 is a schematic diagram schematically showing a cross-section of cemented carbide according to the present embodiment.

DETAILED DESCRIPTION

Problem to be Solved by the Present Disclosure

In a hard material in PTL 1, the composite carbonitride solid solution defined as a first hard phase includes a core expressed as $(Ti_{1-x-y}L_xMo_y)(C_{1-z}N_z)$. In this chemical formula, L represents at least one element selected from the group consisting of Zr, Hf, Nb, and Ta, x is not smaller than 0.01 and not greater than 0.5, y is not smaller than 0.03 and not greater than 0.05, and z is not smaller than 0.05 and not greater than 0.75. Therefore, in the composite carbonitride solid solution, an atomic ratio of Mo occupied in all metal elements (Ti, L, and Mo) is not lower than 0.03. Mo, however, lowers resistance of carbonitride itself against reactivity with steel, and therefore a content thereof is preferably low.

Depending on a sintering condition, on a surface of a hard material containing nitrogen-containing source materials like the composite carbonitride solid solution, a β-free layer which does not contain the composite carbonitride solid solution but is composed of WC and Co may be formed. PTL 1, however, does not mention the β-free layer, and it is also unclear in distribution of the first hard phase (composite carbonitride solid solution) at the surface of the hard material and in a direction of depth from the surface to the inside. Uniform distribution of composite carbonitride at the surface of the hard material and in the direction of depth from the surface to the inside leads to cemented carbide excellent in homogeneity in hardness and toughness, and hence cemented carbide is expected to be excellent also in resistance against reactivity with steel. Such a hard material, however, has not yet been obtained and development thereof has highly been demanded.

Under the circumstances, an object of the present disclosure is to provide cemented carbide with excellent resistance against reactivity with steel, a cutting tool containing the same, and a method of manufacturing cemented carbide.

Effect of the Present Disclosure

According to the above, cemented carbide with excellent resistance against reactivity with steel, a cutting tool containing the same, and a method of manufacturing cemented carbide can be provided.

Description of Embodiment of the Present Disclosure

The present inventors have developed cemented carbide to which composite carbonitride expressed as $Ti_{1-X-Y}Nb_XW_YC_{1-Z}N_Z$ is applied as a new source material. The present inventors have found that the composite carbonitride expressed as $Ti_{1-X-Y}Nb_XW_YC_{1-Z}N_Z$ is higher in resistance against reactivity with steel than a conventional Ti-based compound. Furthermore, the present inventors have successfully obtained cemented carbide excellent in homogeneity in hardness and toughness by achieving a uniform ratio (%) of an area occupied by second hard-phase particles at a surface of a sintered material and in the vicinity of the surface (inside) by appropriately controlling a sintering condition. Thus, the present inventors have developed cemented carbide remarkably excellent in resistance against reactivity with steel and arrived at the present disclosure. A beta (β)-free layer herein refers to a structure composed of first hard-phase particles and a metallic binder phase without containing composite carbonitride expressed as $Ti_{1-X-Y}Nb_XW_YC_{1-Z}N_Z$ described above.

Embodiments of the present disclosure are initially listed and described.

[1] Cemented carbide according to one manner of the present disclosure contains first hard-phase particles containing WC, second hard-phase particles which contain carbonitride containing at least Ti and Nb, and a metallic binder phase containing an iron-group element. The second hard-phase particle includes a granular core portion and a peripheral portion which covers at least a part of the core portion. The core portion contains composite carbonitride expressed as $Ti_{1-X-Y}Nb_XW_YC_{1-Z}N_Z$, where X is not smaller than 0.1 and not greater than 0.2, Y is not smaller than 0 and not greater than 0.05, and Z is not smaller than 0.3 and not greater than 0.6. The peripheral portion is different in composition from the core portion. The cemented carbide has an absolute value of a difference not greater than 10, between a ratio (%) of an area occupied by the second hard-phase particles at a surface of the cemented carbide and a ratio (%) of an area occupied by the second hard-phase particles in a region extending from the surface by 0.5 mm in a direction of depth. Such cemented carbide can be excellent in resistance against reactivity with steel.

[2] In the core portion, a total amount of V, Cr, and Mo occupied in a total amount of Ti, Nb, W, V, Cr, and Mo is preferably smaller than 2 atomic %. Since V, Cr, and Mo representing elements which affect characteristics of cemented carbide can thus sufficiently be suppressed, higher resistance against reactivity with steel can be achieved.

[3] The core portion preferably has a particle size at 50% in a number-based cumulative distribution not greater than 1.5 µm. Since particularly bending strength and toughness among mechanical strengths can thus be improved, higher resistance against reactivity with steel can be achieved.

[4] A volume ratio of the core portion in the cemented carbide is preferably not lower than 2 volume % and not higher than 20 volume %. Further higher resistance against reactivity with steel can thus be obtained.

[5] A cutting tool according to one manner of the present disclosure contains the cemented carbide. Thus, a cutting tool with such characteristics of the cemented carbide as excellent resistance against reactivity with steel can be provided.

[6] The cutting tool includes a substrate composed of the cemented carbide and a coating film which covers the substrate. Such a cutting tool can also achieve such characteristics of the cemented carbide as excellent resistance against reactivity with steel.

[7] A method of manufacturing cemented carbide according to one manner of the present disclosure is a method of manufacturing cemented carbide including preparing powders of composite carbonitride expressed as $Ti_{1-X-Y}Nb_XW_YC_{1-Z}N_Z$, WC powders, and powders of an iron-group element, obtaining mixed powders by mixing the powders of the composite carbonitride, the WC powders, and the powders of the iron-group element, obtaining a formed material by pressing the mixed powders, and obtaining a sintered material by sintering the formed material. X is not smaller than 0.1 and not greater than 0.2, Y is not smaller than 0 and not greater than 0.05, and Z is not smaller than 0.3 and not greater than 0.6. The cemented carbide obtained by the method of manufacturing cemented carbide has an absolute value of a difference not greater than 10, between a ratio (%) of an area occupied by second hard-phase particles containing the composite carbonitride at a surface of the cemented carbide and a ratio (%) of an area occupied by the second hard-phase particles in a region extending from the surface by 0.5 mm in a direction of depth. With such a method of manufacturing cemented carbide, cemented carbide excellent in resistance against reactivity with steel can be obtained.

[8] In the obtaining a sintered material, preferably, the formed material is sintered under such sintering conditions as a nitrogen partial pressure not lower than 3 kPa and not higher than 15 kPa, a holding temperature not lower than 1300° C. and not higher than 1600° C., and a holding time period not shorter than 0.5 hour and not longer than 2 hours. Cemented carbide excellent in resistance against reactivity with steel can thus be obtained at high yield.

Details of Embodiment of the Present Disclosure

Though an embodiment of the present disclosure (hereinafter also denoted as the "present embodiment") will further be described hereinafter in detail, the present embodiment is not limited thereto. The description will be given below with reference to drawings.

An expression in a format "A to B" herein means the upper limit and the lower limit of a range (that is, not smaller than A and not greater than B). When a unit is not given for A but a unit is given only for B, A and B are common in unit. When a compound is herein expressed with a chemical formula and when an atomic ratio is not particularly limited, all atomic ratios that have conventionally been known are encompassed and the atomic ratio should not necessarily be limited only to those in a stoichiometric range. For example, when an expression "TiAlN" is given, a ratio among atoms which form TiAlN is not limited to Ti:Al:N=0.5:0.5:1 but all atomic ratios that have conventionally been known are encompassed. This is also applicable to an expression of a compound other than "TiAlN." In the present embodiment, a compound expressed by a metal element such as titanium (Ti), aluminum (Al), silicon (Si), tantalum (Ta), chromium (Cr), niobium (Nb), or tungsten (W) and a non-metal element such as nitrogen (N), oxygen (O), or carbon (C) does not necessarily have to have a stoichiometric composition. "Mechanical strength" herein means mechanical strength including various characteristics such as wear resistance, chipping resistance, and bending strength.

[Cemented Carbide]

Cemented carbide according to the present embodiment contains first hard-phase particles a containing WC, second hard-phase particles b which contain carbonitride containing at least Ti and Nb, and a metallic binder phase c containing an iron-group element as shown in FIG. 1. Second hard-phase particle b includes a granular core portion ba and a peripheral portion bb which covers at least a part of core portion ba. Core portion ba contains composite carbonitride expressed as $Ti_{1-X-Y}Nb_XW_YC_{1-Z}N_Z$, where X is not smaller than 0.1 and not greater than 0.2, Y is not smaller than 0 and not greater than 0.05, and Z is not smaller than 0.3 and not greater than 0.6. Peripheral portion bb is different in composition from core portion ba. The cemented carbide has an absolute value of a difference not greater than 10, between a ratio (%) of an area occupied by second hard-phase particles b at a surface thereof and a ratio (%) of an area occupied by second hard-phase particles b in a region extending from the surface by 0.5 mm in a direction of depth. Since such cemented carbide uniformly contains second hard-phase particles at the surface thereof and in the vicinity of the surface (inside), it can have such characteristics as excellent homogeneity in hardness and toughness and hence excellent resistance against reactivity with steel.

<First Hard-Phase Particle>

First hard-phase particles a contain WC. First hard-phase particles a are mainly composed of tungsten carbide (WC). First hard-phase particles a can contain, in addition to WC, an inevitable element introduced in a process for manufacturing WC and a trace amount of an impurity element. A content of WC in first hard-phase particles a is preferably not lower than 99 mass % from a point of view of an effect of the present disclosure. Examples of an element other than W and C which can be contained in first hard-phase particles a can include molybdenum (Mo) and chromium (Cr).

<Second Hard-Phase Particle>

Second hard-phase particles b contain carbonitride containing at least Ti and Nb. In particular, second hard-phase particle b includes granular core portion ba and peripheral portion bb which covers at least a part of core portion ba. Core portion ba contains composite carbonitride expressed as $Ti_{1-X-Y}Nb_XW_YC_{1-Z}N_Z$ where X is not smaller than 0.1 and not greater than 0.2, Y is not smaller than 0 and not greater than 0.05, and Z is not smaller than 0.3 and not greater than 0.6. Peripheral portion bb is different in composition from core portion ba. When granular core portion ba in second hard-phase particle b has a composition (Ti, Nb, W, C, and N) at an atomic ratio within the range described above, cemented carbide can achieve excellent mechanical strength. Second hard-phase particle b includes core portion ba and peripheral portion bb which covers at least a part of core portion ba so that adhesion strength between second hard-phase particle b and metallic binder phase c is enhanced and an effect of excellent mechanical strength can be obtained.

(Core Portion)

Core portion ba contains composite carbonitride expressed as $Ti_{1-X-Y}Nb_XW_YC_{1-Z}N_Z$ where X is not smaller than 0.1 and not greater than 0.2, Y is not smaller than 0 and not greater than 0.05, and Z is not smaller than 0.3 and not greater than 0.6. Core portion ba is mainly composed of Ti and contains Nb as a sub component. The core portion may further contain W as a third component. When values of X and Y are within the range described above, composite carbonitride can achieve both of improved mechanical strength and resistance against reactivity with steel in a balanced manner. An atomic ratio X of Nb is preferably not lower than 0.13 and not higher than 0.17. An atomic ratio Y of W is preferably not lower than 0 and not higher than 0.03. An atomic ratio (1-X-Y) of Ti is preferably not lower than 0.75 and not higher than 0.9 from a point of view of setting an amount of addition of the sub component and the third component to at most a solid solubility limit and sufficiently exhibiting an effect of an added metal element. Z which represents an atomic ratio of carbon (C) and nitrogen (N) in the composite carbonitride is preferably not lower than 0.4 and not higher than 0.6. Though a composition of core portion ba should not particularly be restricted so long as the effect of the present disclosure is exhibited and core portion ba is different in composition from peripheral portion bb, exemplary compositions can include $Ti_{0.85}Nb_{0.15}C_{0.5}N_{0.5}$ and $Ti_{0.8}Nb_{0.17}W_{0.03}C_{0.45}N_{0.55}$.

In core portion ba, a total amount of V, Cr, and Mo occupied in a total amount of Ti, Nb, W, V, Cr, and Mo is preferably lower than 2 atomic %. The total content of V, Cr, and Mo occupied in the total amount of Ti, Nb, W, V, Cr, and Mo in core portion ba is more preferably not higher than 1 atomic %. The content is most preferably 0.

Core portion ba may contain an element such as V, Cr, and Mo described above as an impurity or a trace element in addition to Ti which is a main component, Nb which is a sub component, and W which is a third component. In the present embodiment, a total content of V, Cr, and Mo among the elements above is preferably lower than 2 atomic % with respect to all of these metal elements. Higher resistance against reactivity with steel can thus be obtained. When the content is not lower than 2 atomic %, these impurities may adversely affect mechanical strength and resistance against reactivity with steel of carbonitride itself.

A composition and an atomic ratio of the composite carbonitride contained in core portion ba can be identified by analyzing a cut plane obtained by cutting cemented carbide along an arbitrary plane with an energy dispersive X-ray spectroscope (EDX) attached to a scanning electron microscope (SEM). A composition and an atomic ratio of the composite carbonitride can be found, for example, by preparing a cut plane of one piece of cemented carbide and subjecting core portion ba included in second hard-phase particle b which appears in the cut plane to measurement with the apparatus. A content of WC in first hard-phase particles a and a content of an iron-group element in metallic binder phase c which will be described later can also be identified by the same measurement method by subjecting first hard-phase particle a or metallic binder phase c which appears in the cut plane to measurement. The cut plane is preferably polished with focused ion beam (FIB) before observation with the SEM.

Core portion ba is granular and has a grain size at 50% in a number-based cumulative distribution (which is also denoted as "D50 of the core portion" below) preferably not greater than 1.5 μm. Namely, a plurality of core portions ba which appear in the cut plane have D50 preferably not greater than 1.5 μm. Since particularly bending strength and toughness among mechanical strengths can thus be improved, higher resistance against reactivity with steel can be achieved. Core portion ba has D50 more preferably not greater than 1 μm, and a lower limit value thereof is 0.1 μm.

A grain size of individual core portion ba can be found by subjecting an SEM image of a cross-section (a cut plane) of cemented carbide to image analysis. For example, ImageJ (https://imagej.nih.gov/ij/) can be used as software to be used for image analysis. The "grain size" of core portion ba means a maximum Feret diameter. A population parameter (that is, the number of "grain sizes" of core portion ba) for finding D50 of core portion ba is set to at least 50 and preferably to at least 100. An SEM image for image analysis is to be picked up at a magnification of 3000 to 5000× from a point of view of accuracy in analysis, and grain sizes of core portions ba in number satisfying the population parameter are preferably prepared by setting a plurality of fields of view.

A volume ratio of core portion ba occupied in cemented carbide is preferably not lower than 2 volume % and not higher than 20 volume %. Further higher resistance against reactivity with steel can thus be obtained. A volume ratio of core portion ba occupied in cemented carbide is more preferably not lower than 10 volume % and not higher than 20 volume %.

A volume ratio of core portion ba occupied in cemented carbide can be found as in analysis of D50 of core portion ba. More specifically, an area ratio of core portion ba in an observation field of view can be found by preparing the cut plane described above, observing the cut plane with the SEM at a magnification from 3000 to 5000×, and analyzing an image with the software described above. Then, the area ratio is regarded as a volume ratio of core portion ba occupied in cemented carbide by regarding the area ratio as continuing also in a direction of depth of the cut plane. A volume ratio of core portion ba occupied in cemented carbide can thus be found. Preferably, SEM images of one cut plane picked up in at least three fields of view are prepared and then subjected to image analysis described above, and an average of values calculated therefrom is defined as a volume ratio of core portion ba occupied in cemented carbide.

(Peripheral Portion)

Second hard-phase particle b includes peripheral portion bb which covers at least a part of core portion ba. Peripheral portion bb is formed in a step of sintering cemented carbide (a fourth step) which will be described later. Peripheral portion bb is formed around core portion ba as a composition rich in atoms of W and C in composite carbonitride (that is, $Ti_{1-X-Y}Nb_XW_YC_{1-Z}N_Z$) as a result of formation of a solid solution and re-precipitation of particles of composite carbonitride and WC particles therearound in liquid phase sintering. Therefore, peripheral portion bb is different in composition from core portion ba.

Peripheral portion bb functions as an adhesive layer which enhances adhesion strength between second hard-phase particle b and metallic binder phase c. Lowering in interfacial strength between second hard-phase particle b and metallic binder phase c can thus be suppressed and mechanical characteristics of cemented carbide can thus be improved. Peripheral portion bb may partially or entirely cover core portion ba so long as the effect of the present disclosure is exhibited, and a thickness thereof should not be restricted either. A composition of peripheral portion bb should not particularly be restricted so long as the effect of the present disclosure is exhibited and the peripheral portion is different in composition from core portion ba, and exemplary compositions thereof can include $Ti_{0.77}Nb_{0.13}W_{0.1}C_{0.5}N_{0.5}$ and $Ti_{0.67}Nb_{0.13}W_{0.2}C_{0.65}N_{0.35}$.

(Ratio (%) of Area Occupied by Second Hard-Phase Particles at Surface and in Vicinity Thereof)

The cemented carbide according to the present embodiment has an absolute value of a difference not greater than 10, between a ratio (%) of an area occupied by second hard-phase particles at a surface thereof and a ratio (%) of an area occupied by second hard-phase particles in a region extending from the surface by 0.5 mm in a direction of depth, which means that cemented carbide according to the present embodiment is substantially equal in ratio (%) of the area occupied by second hard-phase particles at the surface of cemented carbide and in the vicinity of the surface and hence homogenous. Since there is no difference in hardness or toughness between the surface of cemented carbide and the vicinity of the surface (inside), the cemented carbide can be excellent in homogeneity in hardness and toughness and hence excellent in resistance against reactivity with steel.

A method of calculating a ratio (%) of an area occupied by second hard-phase particles at the surface of cemented carbide and a ratio (%) of an area occupied by second hard-phase particles in the region extending from the surface by 0.5 mm in the direction of depth is as set forth below. Initially, a sample piece including the surface of cemented carbide and the region extending from the surface by 0.5 mm in the direction of depth is prepared. A portion of this sample piece corresponding to the surface is observed with an SEM at a magnification from 3000 to 5000×. In succession, an image in an observed field of view is analyzed with the software described above to find a ratio (%) of an area occupied by second hard-phase particles in the field of view. A ratio (%) of an area occupied by second hard-phase particles at the surface of cemented carbide can thus be found.

Then, a cut plane in parallel to the surface of cemented carbide and at a depth of 0.1 mm from the surface in the direction of depth (which is also denoted as a "0.1-mm depth plane" below) is prepared by polishing the sample piece. The 0.1-mm depth plane is observed with the SEM at a magnification from 3000 to 5000×. In succession, an image in an observed field of view is analyzed with the software described above to find a ratio (%) of an area occupied by second hard-phase particles in the field of view. A ratio (%) of an area occupied by second hard-phase particles at the 0.1-mm depth plane of cemented carbide, of the ratio (%) of the area occupied by second hard-phase particles in the region extending from the surface of cemented carbide by 0.5 mm in the direction of depth, can thus be found.

Furthermore, a cut plane in parallel to the surface of cemented carbide and at a depth of 0.2 mm from the surface in the direction of depth (which is also denoted as a "0.2-mm depth plane" below), a cut plane in parallel to the surface of cemented carbide and at a depth of 0.3 mm from the surface in the direction of depth (which is also denoted as a "0.3-mm depth plane" below), a cut plane in parallel to the surface of cemented carbide and at a depth of 0.4 mm from the surface in the direction of depth (which is also denoted as a "0.4-mm depth plane" below), and a cut plane in parallel to the surface of cemented carbide and at a depth of 0.5 mm from the surface in the direction of depth (which is also denoted as a "0.5-mm depth plane" below) are prepared by polishing the sample piece. The 0.2-mm depth plane, the 0.3-mm depth plane, the 0.4-mm depth plane, and the 0.5-mm depth plane are observed with the SEM at a magnification from 3000 to 5000× similarly to the 0.1-mm depth plane, and images thereof are analyzed to find a ratio (%) of an area occupied by second hard-phase particles in each field of view. The ratio (%) of the area occupied by second hard-phase particles at each of the 0.2-mm depth plane, the 0.3-mm depth plane, the 0.4-mm depth plane, and the 0.5-mm depth plane of cemented carbide, of the ratio of the area (%) occupied by second hard-phase particles in the region extending from the surface of cemented carbide by 0.5 mm in the direction of depth, can thus be found.

Finally, an average value of the ratios (%) of the area occupied by second hard-phase particles in the 0.1-mm depth plane to the 0.5-mm depth plane of cemented carbide is calculated and defined as the ratio (%) the area of second hard-phase particles in the region extending from the surface of cemented carbide by 0.5 mm in the direction of depth.

In determination of the area ratio (%) described above, SEM images are prepared by selecting from one sample piece, three locations in the surface of cemented carbide and three locations in each cut plane in the region extending from the surface of cemented carbide by 0.5 mm in the direction of depth. Then, an average of values obtained by the method described above is defined as the ratio (%) of the area of second hard-phase particles at the surface of cemented carbide and in the region extending from the surface of cemented carbide by 0.5 mm in the direction of depth. Therefore, eighteen (6×3) fields of view of SEM images are required for calculating a ratio (%) of an area of second hard-phase particles at the surface of cemented carbide and in the region extending from the surface of cemented carbide by 0.5 mm in the direction of depth.

In the present embodiment, an absolute value of a difference between a ratio (%) of an area occupied by second hard-phase particles at the surface of cemented carbide and a ratio (%) of an area occupied by second hard-phase particles in the region extending from the surface of cemented carbide by 0.5 mm in the direction of depth calculated by the method described above is not greater than 10 (which is referred to as "ten points" or the like). The absolute value of the difference in area ratio (%) is preferably not greater than eight, more preferably not greater than four, and most preferably zero (that is, no difference).

<Metallic Binder Phase>

Metallic binder phase c contains an iron-group element. Metallic binder phase c is mainly composed of an iron-group element. Metallic binder phase c can contain, in addition to the iron-group element, an inevitable element introduced from first hard-phase particles a and second hard-phase particles b and a trace amount of an impurity element. From a point of view of maintaining a state as a metal and avoiding formation of a brittle intermediate compound, a content of the iron-group element in metallic binder phase c is preferably not lower than 90 atomic % and more preferably not lower than 95 atomic %. The upper limit of the content of the iron-group element in metallic binder phase c is 100 atomic %. The iron-group element refers to group 8, group 9, and group 10 elements in the fourth period in the periodic table, that is, iron (Fe), cobalt (Co), and nickel (Ni). Examples of elements other than the iron-group element contained in metallic binder phase c include titanium (Ti) and tungsten (W).

Metallic binder phase c in cemented carbide is mainly composed preferably of Co. A content of the iron-group element except for Co in metallic binder phase c is preferably lower than 1 volume % and more preferably lower than 0.6 volume %.

[Method of Manufacturing Cemented Carbide]

Though a method of manufacturing cemented carbide according to the present embodiment should not particularly be restricted, a method below is preferred. The method of manufacturing cemented carbide includes steps of preparing powders of composite carbonitride expressed as $Ti_{1-X-Y}Nb_XW_YC_{1-Z}N_Z$, WC powders, and powders of an iron-group element (a first step), obtaining mixed powders by mixing the powders of the composite carbonitride, the WC powders, and the powders of the iron-group element (a second step), obtaining a formed material by pressing the mixed powders (a third step), and obtaining a sintered material by sintering the formed material (a fourth step). In $Ti_{1-X-Y}Nb_XW_YC_{1-Z}N_Z$, X is not smaller than 0.1 and not greater than 0.2, Y is not smaller than 0 and not greater than 0.05, and Z is not smaller than 0.3 and not greater than 0.6.

Cemented carbide obtained by the method of manufacturing cemented carbide has an absolute value of a difference not greater than 10, between a ratio (%) of an area occupied by second hard-phase particles containing composite carbonitride at a surface thereof and a ratio (%) of an area occupied by second hard-phase particles in a region extending from the surface by 0.5 mm in a direction of depth. Cemented carbide excellent in resistance against reactivity with steel can thus be obtained.

<First Step>

The first step is a step of preparing powders of composite carbonitride expressed as $Ti_{1-X-Y}Nb_XW_YC_{1-Z}N_Z$, WC powders, and powders of an iron-group element.

In preparation of powders of composite carbonitride, third powders are obtained by mixing first powders containing two elements of Ti and Nb or three elements of Ti, Nb, and W and second powders containing at least graphite (a first operation). Then, a granulated material is obtained by granulating the third powders (a second operation). A powder precursor composed of the composite carbonitride is obtained by subjecting the granulated material to heat treatment at a temperature not lower than 1800° C. in an atmosphere containing nitrogen gas (a third operation). Finally, the powders of the composite carbonitride can be obtained by breaking the powder precursor.

(First Operation)

In the first operation, third powders are obtained by mixing first powders containing two elements of Ti and Nb or three elements of Ti, Nb, and W and second powders containing at least graphite.

The first powders contain two elements of Ti and Nb or three elements of Ti, Nb, and W. The first powders are preferably composed of oxide containing two elements of Ti and Nb or three elements of Ti, Nb, and W. When the first powders are composed of oxide, powders of composite carbonitride small in primary particle size can readily be obtained, and hence a grain size at 50% of a number-based cumulative distribution of the core portion (D50 of the core portion) can be made smaller, for example, to at most 1.5 µm. The first powders may contain at least one element selected from the group consisting of V, Cr, and Mo as a component introduced from facilities used for manufacturing. In this case, in the first powders, a total content of V, Cr, and Mo is preferably lower than 2 atomic % with respect to a total amount of Ti, Nb, W, V, Cr, and Mo. Specifically, the first powders can be composed of composite oxide such as $Ti_{0.9}Nb_{0.1}O_2$ or $Ti_{0.9}Nb_{0.05}W_{0.05}O_2$. The first powders may be mixed powders containing powders of oxide such as $TiO_2$, $Nb_2O_5$, and $WO_3$. An oxidation number of each element or a content of an impurity can be modified unless it is contrary to the object.

Second powders contain at least graphite. The second powders preferably consist of graphite. In the first operation, third powders are obtained by mixing the second powders and the first powders. Thus, in the third operation which will be described later, in an atmosphere containing nitrogen gas, a reduction reaction of the oxide, a solid solution formation reaction as a result of mutual diffusion of Ti, Nb, and W in the reduced oxide, and a carbonitriding reaction of Ti, Nb, and W in a state of a solid solution can simultaneously and continuously proceed. Consequently, composite carbonitride can efficiently be obtained.

A conventionally known method can be employed for a method of mixing first powders and second powders. From a point of view of decrease in particle size at 50% in a number-based cumulative distribution of third powders (which is also denoted as "D50 of third powders" below), a mixing method with the use of a dry ball mill and a mixing method with the use of a wet ball mill high in crushing function can suitably be employed. A mixing method with the use of a rotary blade fluid mixer low in crushing function can also be applied. D50 of third powders is found based on at least 100 particles which appear in a microscopic image observed at a magnification of 10000× with a scanning electron microscope (SEM). A diameter of a circle equal in area to a particle (an equivalent circular diameter) of all particles which appear in the microscopic image is calculated with the use of image analysis software (for example, ImageJ), and an equivalent circular diameter of a particle at 50% in a number-based cumulative distribution is defined as D50 of third powders.

(Second Operation)

In the second operation, a granulated material is obtained by granulating the third powders. A conventionally known granulation method can be employed as the granulation method in the second operation. Examples of the granulation method can include a method with the use of an already known apparatus such as a spray dryer and an extrusion granulator. For granulation, for example, a binder component such as a wax material can be employed as appropriate as a binder. A shape and a dimension of a granulated material should not particularly be restricted. A granulated material can be, for example, in a columnar shape having a diameter from 0.5 to 5 mm and a length from 5 to 20 mm.

(Third Operation)

In the third operation, a powder precursor composed of the composite carbonitride is obtained by subjecting the granulated material to heat treatment at a temperature not lower than 1800° C. in an atmosphere containing nitrogen gas. In the third operation, in an atmosphere containing nitrogen gas, oxygen in the oxide in the first powders contained in the granulated material reacts with graphite in the second powders, so that Ti, Nb, and W in the first powders are reduced. A solid solution formation reaction of reduced Ti, Nb, and W proceeds as a result of mutual diffusion. A carbonitriding reaction of reduced Ti, Nb, and W with nitrogen in the atmosphere and graphite in the second powders also simultaneously occurs. The powder precursor composed of the composite carbonitride expressed as $Ti_{1-X-Y}Nb_XW_YC_{1-Z}N_Z$ described above is thus formed. Nitrogen gas contained in the atmosphere serves as a source of N of composite carbonitride.

In the third operation, when mixed powders obtained by mixing metal powders containing Ti, Nb, and W or carbonitride powders containing Ti, Nb, and W instead of first powders with second powders are subjected to heat treatment, a powder precursor composed of the composite carbonitride cannot be obtained. This is because a carbonitriding reaction of metal powders containing Ti, Nb, and W proceeds early in heat treatment and hence a solid solution formation reaction owing to mutual diffusion of Ti, Nb, and W does not proceed. Since carbonitride powders containing Ti, Nb, and W are chemically stable even in a high-temperature region exceeding 2000° C., a solid solution formation reaction owing to mutual diffusion of Ti, Nb, and W does not proceed.

An atmosphere in heat treatment in the third operation should not particularly be restricted so long as it is an atmosphere containing nitrogen gas. Pure $N_2$ gas or a gas mixture obtained by mixing hydrogen gas ($H_2$ gas), argon gas (Ar gas), helium gas (He gas), or carbon monoxide gas (CO gas) into $N_2$ gas may be employed.

From a point of view of progress and acceleration of a reduction reaction, a solid solution formation reaction, and a carbonitriding reaction of first powders, a temperature during heat treatment in the third operation is preferably not lower than 1800° C. and more preferably not lower than 2000° C. From a point of view of prevention of excessive aggregation of a powder precursor obtained by heat treatment, the temperature is preferably not higher than 2400° C.

A time period for heat treatment in the third operation is preferably adjusted depending on D50 of third powders. For example, when third powders have D50 from 0.3 to 0.5 μm, a time period for heat treatment described above is suitably from 15 to 60 minutes. Preferably, as a value of D50 is smaller, a time period for heat treatment in the third operation is shorter, and as a value of D50 is larger, a time period for heat treatment in the third operation is longer.

In the third operation, a rotary continuous heat treatment apparatus such as a rotary kiln is preferably employed. This heat treatment apparatus includes an inclined rotary reaction tube. The heat treatment apparatus also further includes a heating mechanism which heats the rotary reaction tube, a gas introduction port for introducing gas containing nitrogen into the rotary reaction tube, a gas exhaust port for exhausting the gas containing nitrogen from the rotary reaction tube, an inlet for introducing a granulated material into the rotary reaction tube, and an outlet for taking out a powder precursor from the rotary reaction tube. Such a heat treatment apparatus is preferred because it can perform heat treatment of a granulated material under a constant condition and hence it can continuously and efficiently manufacture a powder precursor of composite carbonitride stable in quality.

In using the heat treatment apparatus in the third operation, initially, the rotary reaction tube is heated to a temperature not lower than 1800° C. by using the heating mechanism, and the inside of the rotary reaction tube is set to a nitrogen atmosphere by introducing gas containing nitrogen gas through the gas introduction port. The granulated material is subjected to heat treatment by continuously supplying the granulated material through the inlet in an upper portion of the rotary reaction tube, rotating the rotary reaction tube, and moving the granulated material through the inside of the rotary reaction tube. A powder precursor composed of composite carbonitride can thus be formed. The powder precursor can be taken out through the outlet in a lower portion of the rotary reaction tube.

Finally, powders of the composite carbonitride are obtained by breaking the powder precursor. A conventionally known breaking method can be used as a method of breaking the powder precursor.

<Second Step>

The second step is a step of obtaining mixed powders by mixing powders of the composite carbonitride described above, WC powders, and powders of an iron-group element. A conventionally known mixing method can be employed as a method of mixing these powders. Examples of the method can include a mixing method with the use of a dry ball mill and a mixing method with the use of a wet ball mill high in crushing function as well as a mixing method with the use of a rotary blade fluid mixer low in crushing function when powders are weakly aggregated.

<Third Step>

The third step is a step of obtaining a formed material by pressing the mixed powders described above. A conventionally known pressing method can be employed as a method of pressing the mixed powders. Examples of the pressing method include a pressing method of filling a mold with the mixed powders and applying a pressure by using a hammer, cold isostatic pressing, injection molding, and extrusion molding. A pressure at the time of pressing is preferably not lower than 0.5 t/cm² (approximately 50 MPa) and not higher than 2.0 t/cm² (approximately 200 MPa).

<Fourth Step>

The fourth step is a step of obtaining a sintered material by sintering the formed material described above. In the present step, preferably, a temperature of a sintering furnace is increased to a temperature region where a liquid phase of the formed material appears and then the formed material is held at a prescribed holding temperature for a prescribed holding time period.

Specifically, the step of obtaining a sintered material is preferably a step of sintering the formed material under such a sintering condition as a nitrogen partial pressure not lower than 3 kPa and not higher than 15 kPa, a holding temperature not lower than 1300° C. and not higher than 1600° C., and a holding time period not shorter than 0.5 hour and not longer than 2 hours. A holding temperature is more preferably not lower than 1400° C. and not higher than 1500° C. and a holding time period is more preferably not shorter than 1 hour and not longer than 1.5 hour. When a nitrogen partial pressure is lower than 3 kPa in the atmosphere during sintering, denitrification reaction occurs at the surface of the formed material and a β-free layer tends to be produced. When the nitrogen partial pressure exceeds 15 kPa, a nitrogen-enriched layer tends to be formed at the surface of the formed material and chipping resistance may be lowered. From such a point of view, the nitrogen partial pressure is preferably not lower than 3 kPa and not higher than 15 kPa and more preferably not lower than 7 kPa and not higher than 10 kPa.

After thus obtaining a sintered material, cemented carbide as a final product can be obtained by machining the sintered material as necessary. The sintered material obtained by such a manufacturing method is uniform in distribution of second hard-phase particles at the surface and in the vicinity of the surface (inside) and hence homogenous. Therefore, the sintered material does not necessarily require machining such as surface polishing. Even when the sintered material is employed as a final product (cemented carbide) with its sintered skin being maintained, it can achieve excellent resistance against reactivity with steel.

A composition and an atomic ratio of the powders of the composite carbonitride can be found by a conventionally known component analysis technique. For example, a composition (a metal, carbon, and nitrogen) and a content in the powders can be identified by inductive plasma emission spectroscopy, high-frequency combustion, or a thermal conductivity technique.

From a point of view of handleability and achievement of both of high hardness and high toughness in application as a cutting tool, a particle size at 50% in a number-based cumulative distribution of the powders of the composite carbonitride (which is also denoted as "D50 of the powders of the composite carbonitride" below) is preferably not smaller than 0.3 μm and not greater than 1.5 μm. A method of measuring D50 of the powders of the composite carbonitride is different from the method of measuring D50 of the core portion. Specifically, D50 of the powders of the composite carbonitride can be found in measurement with the use of a laser diffraction particle size distribution measurement instrument (a trademark "Microtrac® MT3000II" manufactured by MicrotracBEL Corp.) with an index of refraction of particles being set to 2.4. D50 of the powders of the composite carbonitride means D50 of primary particles of the composite carbonitride.

[Cutting Tool]

A cutting tool according to the present embodiment contains the above-described cemented carbide. Therefore, the cutting tool can be excellent in resistance against reactivity with steel. The cutting tool is homogenous and can be excellent in resistance against reactivity with steel because distribution of second hard-phase particles is uniform at the surface of cemented carbide and in the vicinity of the surface (inside) even though the cemented carbide is employed as it is as a final product with its sintered skin being maintained for such a reason as a complicated shape difficult to be machined after sintering.

The cutting tool can suitably be used as a drill, an end mill, a throwaway tip for drilling, a throwaway tip for end milling, a throwaway tip for milling, a throwaway tip for turning, a metal saw, a gear cutting tool, a reamer, a tap, a cutting bite, a wear resistant tool, or a tool for friction stir welding.

When the cutting tool is implemented as a throwaway chip, a substrate may or may not have a chip breaker. A cutting edge ridgeline portion which serves as a central portion of cutting in cutting of a work material may have a sharp edge (a ridge at which a rake face and a flank intersect with each other), may be honed (a sharp edge provided with R), may have a negative land (beveled), and may be honed and have a negative land.

The cutting tool according to the present embodiment includes a substrate composed of cemented carbide and a coating film which covers the substrate. Since the cutting tool further includes the coating film, it has improved wear resistance and chipping resistance. The coating film may cover the entire surface or a part of the substrate (for example, a cutting edge ridgeline portion which is a region highly contributing to cutting performance). A composition of the coating film should not particularly be restricted, and any conventionally known coating film can be adopted.

A conventionally known method can be employed as a method of covering a substrate composed of cemented carbide with a coating film. For example, physical vapor deposition (PVD) or chemical vapor deposition (CVD) can be employed. In particular, examples of PVD can include resistive thermal evaporation, electron beam (EB) evaporation, molecular beam epitaxy (MBE), ion plating, ion beam deposition, and sputtering.

EXAMPLES

Though the present invention will be described hereinafter in further detail with reference to Examples, the present invention is not limited thereto.

Example 1

<Fabrication of Samples 11 to 20 and Samples 111 to 116>

(First Step)

Commercially available $TiO_2$ powders (having a size of approximately 0.5 μm and manufactured by Kojundo Chemical Lab. Co., Ltd.), commercially available $Nb_2O_5$ powders (having a size of approximately 1 μm and manufactured by Kojundo Chemical Lab. Co., Ltd.), and commercially available $WO_3$ powders (having a purity of 3 N and manufactured by Kojundo Chemical Lab. Co., Ltd.) were prepared as first powders. Commercially available graphite powders (having a size of approximately 5 μm and manufactured by Kojundo Chemical Lab. Co., Ltd.) were prepared as second powders. Third powders corresponding to samples 11 to 20 and samples 111 to 116 were obtained by mixing the powders at such blending ratios as achieving designed compositions of composite carbonitride shown for samples 11 to 20 and samples 111 to 116 in Table 1 (first operation). Mixing was performed by a ball mill method.

Then, a granulated material in a columnar shape having an average diameter of approximately 2.4 mm and an average length of approximately 10 mm was obtained by granulating the third powders with an extrusion granulator (an extrusion hole diameter ϕ being set to 2.5 mm) (second operation). An average diameter and an average length of the granulated material were measured with a micrometer.

A powder precursor composed of the composite carbonitride was obtained by subjecting the granulated material to heat treatment at 1800° C. in a nitrogen atmosphere by using the rotary kiln described above (third operation). Approximately thirty minutes were required for the granulated material to pass through a heating section in the rotary kiln.

Finally, the powder precursor was broken in a dry state with the use of a known breaker (a tumbling ball mill with the use of a superhard ball of ϕ 4.5 mm as a crushing medium). Thus, powders of composite carbonitride having designed compositions shown for samples 11 to 20 and samples 111 to 116 in Table 1 were obtained. A composition of the powders of the composite carbonitride was identified by EDX by the method described above.

(Second Step)

Mixed powders were obtained by mixing 5 volume % of the powders of the composite carbonitride described above, 85 volume % of commercially available WC powders (a trademark "WC-25" manufactured by Japan New Metals Co., Ltd.), and 10 volume % of commercially available Co powders (having a size of approximately 5 μm and manufactured by Kojundo Chemical Lab. Co., Ltd.) as powders of an iron-group element. Mixing was performed by a ball mill method for 8 hours.

(Third Step)

A formed material was obtained by granulating the mixed powders with the use of camphor and ethanol and press-forming the granulated material at a pressure of 1 t/cm² (approximately 98 MPa)). The formed material was shaped into SNMN120408 at this time.

(Fourth Step)

The formed material was loaded into a sintering furnace and a temperature of the furnace was increased to 1400° C. Then, a sintered material was obtained by sintering the formed material in an atmosphere at a nitrogen partial pressure of 7 kPa under such conditions as a holding temperature of 1400° C. and a holding time period of one hour. In succession, without machining the sintered material, cemented carbide was obtained with its sintered skin being maintained at the surface. Finally, cutting tools of samples 11 to 20 and samples 111 to 116 were obtained by using this cemented carbide.

A composition of the core portion of a second hard-phase particle in the cutting tools (cemented carbide) was analyzed with EDX with the method described above. Then, the composition matched with the composition of the powders of the composite carbonitride. Specific compositions of the composite carbonitride are shown in Table 1. It was also confirmed with EDX that the peripheral portion specified as being rich in atoms of W and C as compared to the composition of the core portion (that is, $Ti_{1-X-Y}Nb_XW_YC_{1-Z}N_Z$) covered a part of the core portion.

With the method described above, a ratio (%) of an area occupied by second hard-phase particles at the surface of the cutting tool (cemented carbide) and in a region extending from the surface by 0.5 mm in the direction of depth was found. Table 1 shows an absolute value of a difference between the area ratios (%) in this case. It was thus confirmed that, in the cutting tool (cemented carbide) of samples 11 to 20, an absolute value of a difference between the area ratios (%) was from 4 to 8 and not greater than 10.

In present Example 1, in order to conduct a cutting test which will be described later, a necessary number of cutting tools of samples 11 to 20 and samples 111 to 116 were fabricated. The cutting tools of samples 11 to 20 correspond to Examples and the cutting tools of samples 111 to 116 correspond to Comparative Examples.

<Cutting Test>

The cutting tools of samples 11 to 20 and samples 111 to 116 were subjected to a wear resistance test, a chipping resistance test, and a test of resistance against reactivity with steel under conditions below. Table 1 shows results. Better results may be obtained in the test of resistance against reactivity with steel as composite carbonitride expressed as $Ti_{1-X-Y}Nb_XW_YC_{1-Z}N_Z$ has prescribed composition and the surface and the vicinity of the surface (inside) of the cutting tool (cemented carbide) are more homogenous (an absolute value of a difference between the area ratios (%) is not greater than 10).

(Wear Resistance Test)

Work material: SCM435

Peripheral speed: 250 m/min.

Feed: 0.2 mm/rev.

Depth of cut: 2 mm

Cutting fluid: none

In the wear resistance test, a cutting distance (unit of m) until a wear width of a flank of a cutting edge of the cutting tool in each sample was equal to or greater than 0.2 mm was determined as a lifetime. As this distance is longer, wear resistance is evaluated as higher.

(Chipping Resistance Test)

Work material: SCM435 with a hole

Peripheral speed: 200 m/min.

Feed: 0.5 mm/rev.

Depth of cut: 2 mm

Cutting fluid: None

In the chipping resistance test, a cutting distance (unit of m) until chipping of the cutting edge of the cutting tool in each sample was confirmed by a dynamometer and cutting sound was determined as a lifetime. As the distance is longer, chipping resistance is evaluated as higher.

(Test of Resistance Against Reactivity with Steel)

Work material: SCM435

Peripheral speed: 100 m/min.

Feed: 0.15 mm/rev.

Depth of cut: 1.5 mm

Cutting fluid: None

In the test of resistance against reactivity with steel, a cutting distance (unit of m) until a wear width of a flank of a cutting edge of the cutting tool in each sample was equal to or greater than 0.2 mm was determined as a lifetime. As this distance is longer, resistance against reactivity with steel is evaluated as higher.

TABLE 1

| | Designed Composition of Composite Carbonitride $Ti_{1-x-y}Nb_xW_yC_{1-z}N_z$ | | | Absolute Value of Difference Between Area Ratios (%) | Result of Cutting Test | | |
|---|---|---|---|---|---|---|---|
| | X | Y | Z | | Wear Resistance (m) | Chipping Resistance (m) | Resistance Against Reactivity with Steel (min) |
| Sample 11 | 0.15 | 0 | 0.5 | 6 | 1.5 | 1.9 | 2.4 |
| Sample 12 | 0.15 | 0 | 0.6 | 4 | 1.4 | 2.2 | 2.8 |
| Sample 13 | 0.10 | 0 | 0.5 | 5 | 1.6 | 1.8 | 2.0 |
| Sample 14 | 0.10 | 0 | 0.6 | 7 | 1.5 | 1.9 | 2.2 |
| Sample 15 | 0.20 | 0 | 0.4 | 5 | 1.7 | 1.5 | 2.5 |
| Sample 16 | 0.20 | 0 | 0.5 | 7 | 1.6 | 1.4 | 2.7 |
| Sample 17 | 0.20 | 0 | 0.6 | 8 | 1.6 | 1.4 | 3.0 |
| Sample 18 | 0.15 | 0.03 | 0.5 | 4 | 1.9 | 1.2 | 2.1 |
| Sample 19 | 0.15 | 0.05 | 0.5 | 7 | 2.2 | 1.1 | 2.0 |
| Sample 20 | 0.15 | 0 | 0.3 | 5 | 2.4 | 1.3 | 2.0 |
| Sample 111 | 0.03 | 0 | 0.5 | 6 | 1.3 | 1.2 | 1.3 |
| Sample 112 | 0.30 | 0 | 0.5 | 5 | 1.4 | 1.2 | 1.2 |
| Sample 113 | 0.15 | 0 | 0.2 | 3 | 1.9 | 1 | 1.1 |
| Sample 114 | 0.15 | 0 | 0.7 | 23 | 0.8 | 2.2 | 0.7 |
| Sample 115 | 0.20 | 0 | 0.8 | 31 | 0.5 | 2.4 | 0.6 |
| Sample 116 | 0.15 | 0.08 | 0.5 | 7 | 2.4 | 0.5 | 1.9 |

<Discussion>

According to Table 1, it is understood that the cutting tools according to Example (samples 11 to 20) were higher in resistance against reactivity with steel than the cutting tools according to Comparative Example (samples 111 to 116). It is further considered that the cutting tools according to Example (samples 11 to 20) also achieved excellent wear resistance and chipping resistance based on such excellent resistance against reactivity with steel.

Example 2

<Fabrication of Samples 21 to 28>

For samples 21 to 28, first powders to which $V_2O_5$ powders (having a purity of 3 N and manufactured by Kojundo Chemical Lab. Co., Ltd.), $Cr_2O_3$ powders (having a size of approximately 3 μm and manufactured by Kojundo Chemical Lab. Co., Ltd.), and $MoO_3$ powders (having a purity of 3 N and manufactured by Kojundo Chemical Lab. Co., Ltd.) were added such that a designed composition of composite carbonitride was set as shown in Table 2 and an impurity (V, Cr, and Mo) of which total content (atomic %) occupied in a total amount of Ti, Nb, W, V, Cr, and Mo was as shown in Table 2 was contained were prepared. Cemented carbide of samples 21 to 28 was fabricated as in sample 11 except for preparation of first powders. In present Example 2, a product was shaped into SNMN120408 as in Example 1.

Cutting tools of samples 21 to 28 were fabricated by employing the cemented carbide of samples 21 to 28 as a substrate and covering the substrate with a coating film composed of TiAlN under PVD conditions below.

(PVD Condition)

AlTi target (having a target composition of Al:Ti=50:50)
Arc current: 100 A
Bias voltage: −100 V
Pressure in chamber: 4.0 Pa
Reaction gas: nitrogen The cutting tools of samples 21 to 28 were subjected to a cutting test (a test of resistance against reactivity with steel) under conditions below. Table 2 shows results.

(Test of Resistance Against Reactivity with Steel)

Work material: SCM415 with a slot groove
Peripheral speed: 120 m/min.
Feed: 0.4 mm/rev.
Depth of cut: 2 mm
Cutting fluid: None In the test of resistance against reactivity with steel, a time period for cutting was set to five minutes, and a sample in which no chipping was observed at the time point of lapse of five minutes was determined as a good product. The good product of which chipping was not visually observed by the time of lapse of five minutes was evaluated as "5" in Table 2. For a sample of which chipping was visually observed by the time of lapse of five minutes, time (minutes) when chipping was observed is shown.

TABLE 2

| | Designed Composition of Composite Carbonitride $(Ti_{1-x-y}Nb_xW_yC_{1-z}N_z)$ | | | Amount of Impurity atm. % | | | Test of Resistance Against Reactivity with Steel (min.) |
|---|---|---|---|---|---|---|---|
| | X | Y | Z | Amount of V | Amount of Cr | Amount of Mo | |
| Sample 21 | 0.15 | 0 | 0.5 | 0.1 | 0.2 | 0.2 | 5 |
| Sample 22 | 0.15 | 0 | 0.5 | 0.5 | 0.5 | 0.5 | 5 |
| Sample 23 | 0.10 | 0 | 0.5 | 0.3 | 0.7 | 0.2 | 5 |
| Sample 24 | 0.10 | 0 | 0.6 | 0.6 | 1.7 | 0.2 | 4.2 |
| Sample 25 | 0.20 | 0 | 0.4 | 1.3 | 0.4 | 2.2 | 2.1 |
| Sample 26 | 0.20 | 0 | 0.6 | 0.2 | 0.3 | 3.0 | 3.3 |
| Sample 27 | 0.15 | 0.03 | 0.5 | 1.2 | 1.6 | 0.9 | 2.4 |
| Sample 28 | 0.15 | 0.05 | 0.5 | 0.8 | 0.9 | 0.9 | 3.1 |

<Discussion>

According to Table 2, it is understood that the cutting tools of samples 21 to 23 in which a total content of V, Cr, and Mo occupied in a total amount of Ti, Nb, W, V, Cr, and Mo was lower than 2 atomic % were higher in resistance against reactivity with steel than the cutting tools of samples 24 to 28.

Example 3

<Fabrication of Samples 31 to 36>

For samples 31 to 36, powders identical in amount of an impurity (V, Cr, and Mo) and in designed composition of composite carbonitride to sample 21 were used, and granularity of the powders was prepared to achieve D50 (a grain size at 50% in a number-based cumulative distribution) of the core portion shown in Table 3 by breaking the powders in advance by a ball mill method. Then, by performing the second, third, and fourth steps in Example 1, cutting tools of samples 31 to 36 composed of cemented carbide shaped into SNMN120408 as in Example 1 were fabricated. These cutting tools were subjected to a test of resistance against reactivity with steel as in Example 2. Table 3 shows results.

TABLE 3

| | D50 of Core Portion (Grain Size at 50% in Number-Based Cumulative Distribution: μm) | Test of Resistance Against Reactivity with Steel (min.) |
|---|---|---|
| Sample 31 | 1.3 | 4.8 |
| Sample 32 | 1.1 | 4.8 |
| Sample 33 | 0.8 | 5.0 |
| Sample 34 | 2.3 | 3.8 |
| Sample 35 | 1.6 | 4.4 |
| Sample 36 | 3.1 | 3.3 |

<Discussion>

According to Table 3, it is understood that the cutting tools of samples 31 to 33 in which the core portion had D50 not greater than 1.5 μm were higher in resistance against reactivity with steel than the cutting tools of samples 34 to 36.

Example 4

<Fabrication of Samples 41 to 48>

For samples 41 to 48, third powders were obtained by adjusting powders of composite carbonitride of sample 11 described above, WC powders, and Co powders to achieve a volume ratio (%) of the core portion occupied in cemented carbide shown in Table 4. Cutting tools composed of the cemented carbide were fabricated otherwise as in sample 11. In present Example 4, a product was shaped into SNMN120408 as in Example 1. In order to conduct a cutting test which will be described later, a necessary number of cutting tools of samples 41 to 46 were fabricated.

The cutting tools of samples 41 to 46 were subjected to a wear resistance test, a chipping resistance test, and a test of resistance against reactivity with steel under conditions the same as in Example 1. Table 4 shows results.

TABLE 4

| | Volume Ratio of Core Portion Occupied in Cemented Carbide (%) | Result of Cutting Test | | |
|---|---|---|---|---|
| | | Wear Resistance (m) | Chipping Resistance (m) | Resistance Against Reactivity with Steel (m) |
| Sample 41 | 2 | 1.7 | 2.2 | 1.9 |
| Sample 42 | 4 | 1.9 | 2.1 | 2.3 |
| Sample 43 | 8 | 2.1 | 1.9 | 2.0 |
| Sample 44 | 12 | 2.3 | 1.8 | 2.1 |
| Sample 45 | 15 | 2.2 | 1.6 | 2.3 |
| Sample 46 | 18 | 2.3 | 1.5 | 2.0 |
| Sample 47 | 24 | 2.3 | 0.9 | 1.6 |
| Sample 48 | 27 | 2.2 | 0.7 | 1.3 |

<Discussion>

According to Table 4, it is understood that the cutting tools of samples 41 to 46 in which a volume ratio (%) of the core portion occupied in cemented carbide was from 2 to 20 volume % were higher in resistance against reactivity with steel than the cutting tools of samples 47 to 48. It is further considered that the cutting tools of samples 41 to 46 also achieved excellent wear resistance and chipping resistance based on such excellent resistance against reactivity with steel.

Though the embodiment and the examples of the present invention have been described as above, combination of features in each embodiment and example described above as appropriate is also originally intended.

It should be understood that the embodiment and the examples disclosed herein are illustrative and non-restrictive in every respect. The scope of the present invention is defined by the terms of the claims rather than the embodiment and the examples above and is intended to include any modifications within the scope and meaning equivalent to the terms of the claims.

REFERENCE SIGNS LIST a first hard-phase particle; b second hard-phase particle; ba core portion; bb peripheral portion; c metallic binder phase

The invention claimed is:

1. Cemented carbide comprising:
first hard-phase particles containing WC;
second hard-phase particles which contain carbonitride containing at least Ti and Nb; and
a metallic binder phase containing an iron-group element,
the second hard-phase particle including a granular core portion and a peripheral portion which covers at least a part of the core portion,
the core portion containing composite carbonitride expressed as $Ti_{1-X-Y}Nb_XW_YC_{1-Z}N_Z$, where X is not smaller than 0.1 and not greater than 0.2, Y is not smaller than 0 and not greater than 0.05, and Z is not smaller than 0.3 and not greater than 0.6,
the peripheral portion being different in composition from the core portion,
the cemented carbide having an absolute value of a difference not greater than 10, between a ratio (%) of an area occupied by the second hard-phase particles at a surface of the cemented carbide and a ratio (%) of an area occupied by the second hard-phase particles in a region extending from the surface by 0.5 mm in a direction of depth.

2. The cemented carbide according to claim 1, wherein in the core portion, a total amount of V, Cr, and Mo occupied in a total amount of Ti, Nb, W, V, Cr, and Mo is smaller than 2 atomic %.

3. The cemented carbide according to claim 1, wherein the core portion has a particle size at 50% in a number-based cumulative distribution not greater than 1.5 μm.

4. The cemented carbide according to claim 1, wherein a volume ratio of the core portion in the cemented carbide is not lower than 2 volume % and not higher than 20 volume %.

5. A cutting tool comprising the cemented carbide according to claim 1.

6. The cutting tool according to claim 5, comprising:
a substrate composed of the cemented carbide; and
a coating film which covers the substrate.

7. A method of manufacturing cemented carbide comprising:
preparing powders of composite carbonitride expressed as $Ti_{1-X-Y}Nb_XW_YC_{1-Z}N_Z$, WC powders, and powders of an iron-group element;
obtaining mixed powders by mixing the powders of the composite carbonitride, the WC powders, and the powders of the iron-group element;
obtaining a formed material by pressing the mixed powders; and
obtaining a sintered material by sintering the formed material,
X being not smaller than 0.1 and not greater than 0.2,
Y being not smaller than 0 and not greater than 0.05,
Z being not smaller than 0.3 and not greater than 0.6,
the cemented carbide obtained by the method of manufacturing cemented carbide having an absolute value of a difference not greater than 10, between a ratio (%) of an area occupied by second hard-phase particles containing the composite carbonitride at a surface of the cemented carbide and a ratio (%) of an area occupied by the second hard-phase particles in a region extending from the surface by 0.5 mm in a direction of depth, wherein
in the obtaining a sintered material, the formed material is sintered under such sintering conditions as a nitrogen partial pressure not lower than 7 kPa and not higher than 15 kPa, a holding temperature not lower than 1300° C. and not higher than 1600° C., and a holding time period not shorter than 0.5 hour and not longer than 2 hours.

* * * * *